United States Patent [19]

Weinberg

[11] Patent Number: 5,031,576
[45] Date of Patent: Jul. 16, 1991

[54] PET COLLAR

[75] Inventor: Robert Weinberg, East Brunswick, N.J.

[73] Assignee: American Leather Specialties Corp., Brooklyn, N.Y.

[21] Appl. No.: 461,702

[22] Filed: Jan. 8, 1990

[51] Int. Cl.⁵ .............................................. A01K 27/00
[52] U.S. Cl. .......................................... 119/106; 2/338
[58] Field of Search ........................ 119/106, 96, 109; 2/338, 311, 312; 54/24, 34

[56] References Cited

U.S. PATENT DOCUMENTS

| 3,605,384 | 9/1971 | Pacini | 119/96 X |
| 3,669,107 | 6/1972 | Posey | 119/96 X |
| 4,091,766 | 5/1978 | Colliard | 119/106 |
| 4,250,838 | 2/1981 | Ott | 119/106 |
| 4,273,130 | 6/1981 | Simpson | 2/238 X |
| 4,559,906 | 12/1985 | Smith | 119/96 |
| 4,584,967 | 4/1986 | Taplin | 119/109 |
| 4,685,668 | 8/1987 | Newlin, Jr. | 2/238 X |
| 4,719,876 | 1/1988 | Wilken | 119/106 |
| 4,787,340 | 11/1988 | Kirtley | 119/106 |

Primary Examiner—Gene Mancene
Assistant Examiner—R. Thomas Price
Attorney, Agent, or Firm—Amster Rothstein & Ebenstein

[57] ABSTRACT

A pet collar is disclosed which provides a great variety of length of adjustments wherein a strap has a buckle at one end and a connector at the other end. The connector is attachable to the outer surface of the strap at a variety of positions to retain the end against the strap.

10 Claims, 2 Drawing Sheets

PET COLLAR

BACKGROUND OF THE INVENTION

The present invention relates to a pet collar and more particularly to pet collars in which the free end is retained against the pet collar preventing it from hanging loosely.

Pet collars with various closing means are known in the prior art. For example, U.S. Pat. No. 4,250,838 discloses two embodiments, one of which is closed with a buckle and the other which is closed with hook-and-loop type fastener. Prior art pet collars which are closed by hook-and-loop type fasteners have the problem that the pet may use it's paw to remove the collar. Pet collars which are closed with buckles are limited in their degree of adjustability because the loose end of the collar dangles and is subject to being chewed by the pet, which is not healthy for the animal and could increase wear on the collar. Buckle type collars therefore must have a very limited degree of adjustability in order to prevent the loose end from being long enough to be dangerous.

SUMMARY OF THE INVENTION

In the present invention, the pet collar includes a strap with first and second end portions and inner and outer surfaces. The first end portion of the strap incorporates closing means which coact with the second end portion to close the pet collar. One or more first mating connectors is located on the outer surface of the strap and a second mating connector is located at the second end portion of the strap. This second mating connector coacts with one of the first mating connectors to retain the second end portion in position when the pet collar is closed.

The primary objective of this invention is to provide a pet collar with a high degree of adjustability which can not be removed by the pet and will not have a loose end.

A further object of the present invention is to provide such a pet collar which is inexpensive to construct.

Further objects of this invention will become apparent by reference to the following description of a present preferred but nonetheless illustrative embodiment of the invention. This description is for the purpose of fully disclosing the invention without placing limitations thereon.

BRIEF DESCRIPTION OF THE DRAWINGS

The figures in the drawings are briefly described as follows.

DETAILED DESCRIPTION OF THE PREFERRED EMBODIMENT

Figure 1:
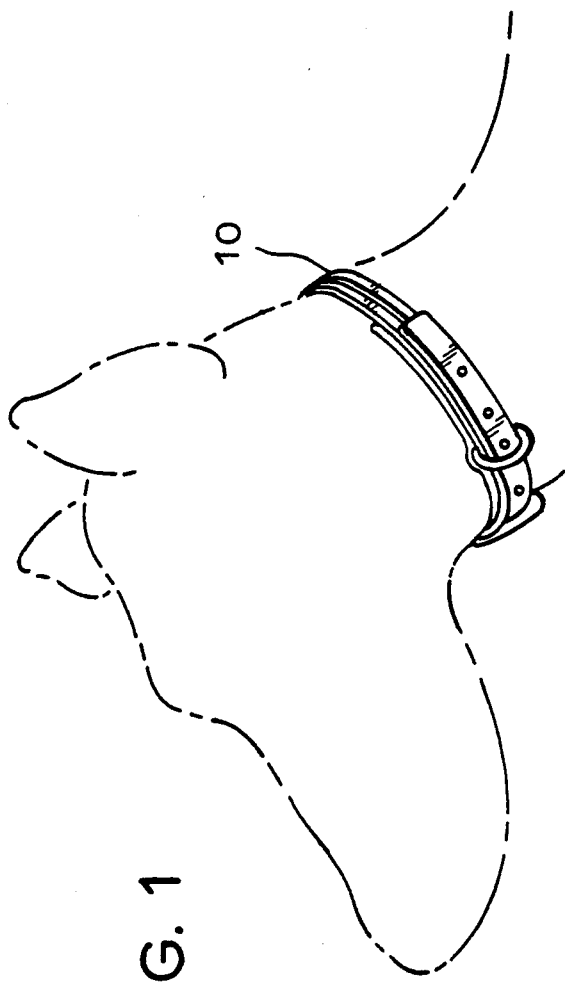
FIG. 1 is a perspective view showing the pet collar in place around the neck of an animal.

Referring now to FIG. 1, the pet collar 10 is illustrated as it would be worn by a pet.

Figure 2:
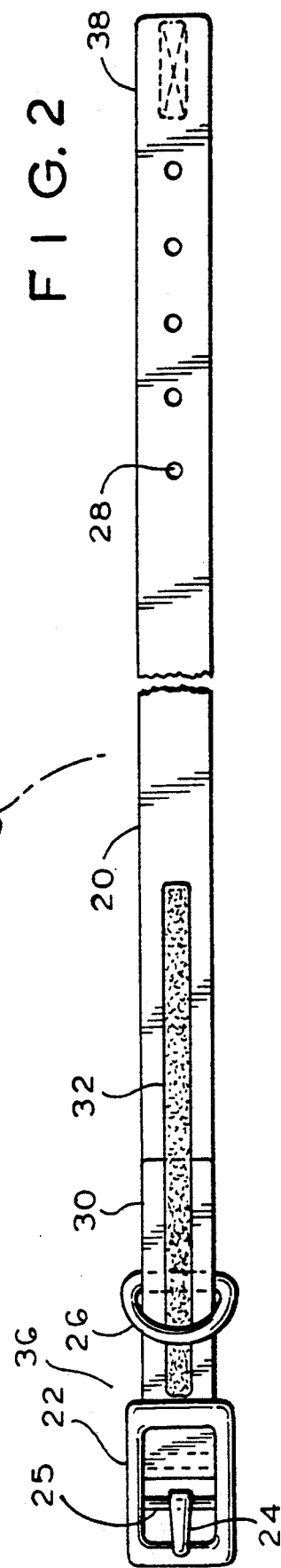
FIG. 2 is a front elevational view showing the outer surface of the pet collar in the open position.

Referring to FIG. 2, pet collar 10 includes strap 20 and is illustrated in an open position such that the outer surface 30 of strap 20 is visible. Strap 20 includes the first end portion 36 which incorporates closing means 22. Closing means 22 is illustrated in this embodiment as a buckle, with pin 24 that pivots along axis 25. Also located on first end portion 36 is a first mating connector 32, or a series of first mating connectors, which is illustrated in this embodiment as an elongated strip of hook-and-loop type fastener. Additionally, at the first end portion 36 is located leash communicating means 26 illustrated in this embodiment as a D-ring. At the second end portion 38 of strap 20 are a multiplicity of spaced holes 28 for co-action with pin 24 of closing means 22 to close pet collar 10.

Figure 3:
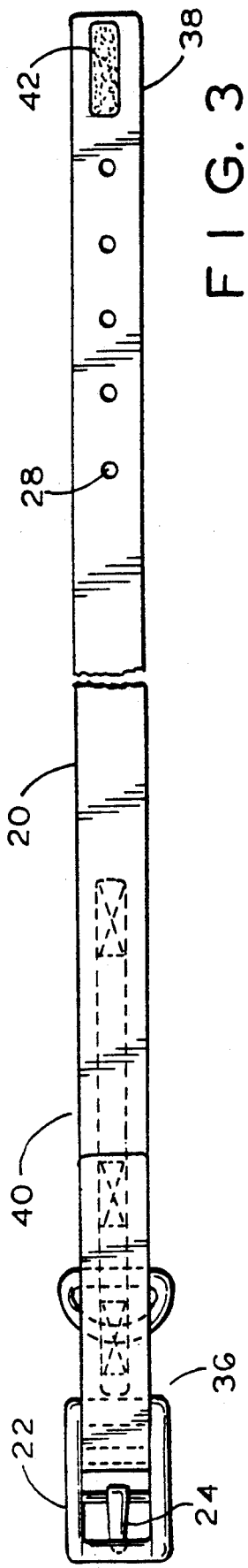
FIG. 3 is a rear elevational view showing the inner surface of the pet collar in the open position.

Referring to FIG. 3, inner surface 40 of strap 20 is illustrated. A second mating connector 42 is affixed at the second end portion 38 of strap 20. Second mating connector 42 co-acts with first mating connector 32 to fixably attach the second end portion 38 to the outer surface 30 of the pet collar. In the preferred embodiment the second mating connector is a short piece of hook-type fastener.

Figure 4:
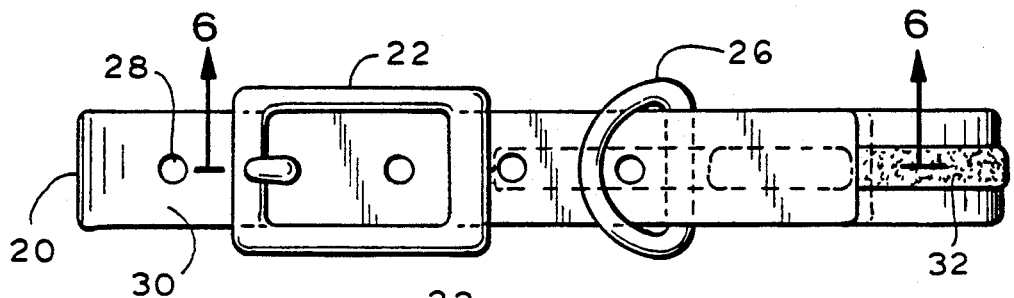
FIG. 4 is a front elevational view of the pet collar in its closed position.

FIG. 4 illustrates pet collar 10 in a closed position wherein the buckle 22 acts with one of the holes 28 in the second end portion 38 of strap 20 to close pet collar 10. Leash communicating means 26 is shown as a D-ring affixed at the first end portion 36 of strap 20. Second end portion 38 of strap 20 is passed through the D-ring to be retained in place by first and second mating connectors 32, 42.

Figure 5:
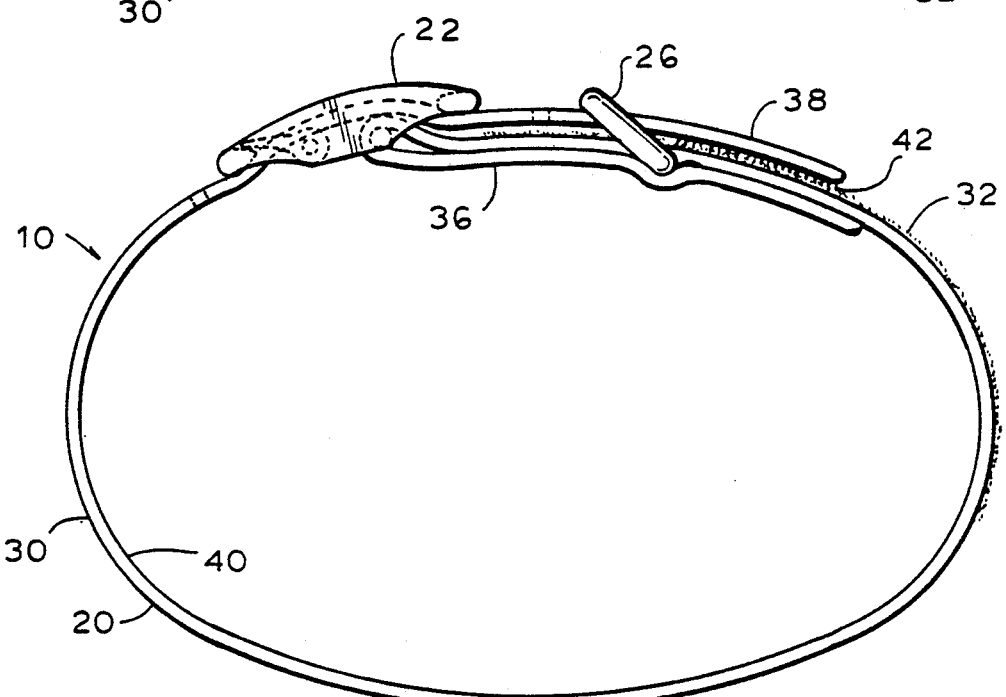
FIG. 5 is a side elevational view of the pet collar in its closed position.

FIG. 5, like FIG. 4, illustrates pet collar 10 in a closed position 20, with buckle 22 operating to close pet collar 10, end portion 38 being retained by D-ring 26 and first mating connector 32 and second mating connector 42 coacting to prevent end portion 38 of strap 20 from flapping loosely.

Figure 6:
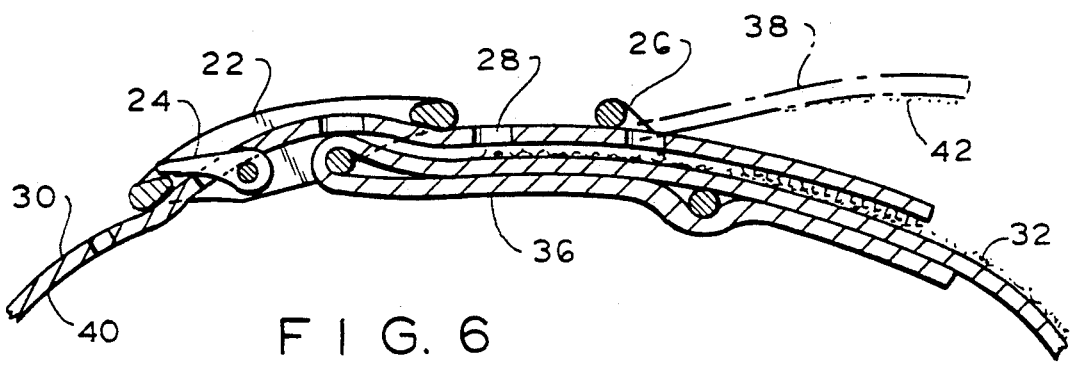
FIG. 6 is a sectional view taken along the lines 6—6 shown in FIG. 4.

In FIG. 6 second end portion 38 is shown having been passed through buckle 22 and D-ring 26 with the hook-type fastener 42 connected to loop-type fastener 32 of the outer surface 30. The connection of hook-and-loop type fasteners 32, 42 prevents second end portion 38 of strap 20 from hanging loosely and being chewed, dragged, or toyed with.

Although the illustrative embodiment of the present invention has been described in detail with reference to the accompanying drawings, it is to be understood that the invention is not limited to this precise embodiment and that various changes or modifications may be effected therein by one skilled in the art without departing from the scope or spirit of the invention.

What is claimed is:

1. A pet collar comprising:
    a strap having first and second end portions with an inner surface and an outer surface, the first end portion of said strap incorporating closure means for coaction with the strap to securely close said pet collar;
    one or more first mating connectors located on the outer surface of said strap; and
    a second mating connector located on the inner surface at the second end portion of said strap and for coaction with one of said first mating connectors to retain said second end portion in position when said pet collar is closed.

2. A pet collar as set forth in claim 1 in which the first and second mating connectors are hook-and-loop fasteners.

3. A pet collar as set forth is claim 2 in which said second mating connector is a hook-type fastener and said first mating is a loop-type fastener for coaction with said hook-type fastener.

4. A pet collar as set forth in claim 1 in which the first mating connectors are located lengthwise at said first end portion and the second mating connectors are located on said inner surface.

5. A pet collar as set forth in claim 1 further including means for communicating with a pet leash.

6. A pet collar comprising:
a strap having first and second end portions with an inner surface and an outer surface, the first end portion of said strap incorporating closure means for coaction with the second end portion to close said pet collar, said closure means incorporating a pin, and said second end portion having a multiplicity of spaced holes along the length of said strap for communication with said pin;
one or more first mating connectors located on the outer surface of said strap; and
a second mating connector located at the second end portion of said strap and for coaction with one of said first mating connectors to retain said second end portion in position when said pet collar is closed.

7. A pet collar as set forth in claim 6 in which the first and second mating connectors are hook-and-loop fasteners.

8. A pet collar as set forth in claim 6 in which the first mating connectors are located along the length of said strap at said first end portion and the second mating connectors are located on said inner surface.

9. A pet collar as set forth in claim 6 further including means for communicating with a pet leash.

10. A pet collar as set forth in claim 7 in which said second mating connector is a hook-type fastener and said first mating connector is a loop-type fastener for coaction with said hook-type fastener.

* * * * *